(12) United States Patent
Sander et al.

(10) Patent No.: US 7,497,277 B2
(45) Date of Patent: Mar. 3, 2009

(54) CLAMPING DEVICE FOR AXIALLY HARMONICALLY OSCILLATING COMPONENTS

(75) Inventors: Bernhard Sander, Munich (DE); Alexander John, Feldkirch-Tisis (AT)

(73) Assignee: Hilti Aktiengesellschaft, Schaan (LI)

( * ) Notice: Subject to any disclaimer, the term of this patent is extended or adjusted under 35 U.S.C. 154(b) by 313 days.

(21) Appl. No.: 11/396,130

(22) Filed: Mar. 31, 2006

(65) Prior Publication Data
US 2006/0229132 A1    Oct. 12, 2006

(30) Foreign Application Priority Data
Apr. 6, 2005    (DE) .................. 10 2005 000 027

(51) Int. Cl.
    *E21B 7/04*    (2006.01)
(52) U.S. Cl. .......................... 175/56; 74/110
(58) Field of Classification Search ............ 175/56, 175/403, 405; 173/95, 211; 74/110; 267/137, 267/195; 82/904
See application file for complete search history.

(56) References Cited

U.S. PATENT DOCUMENTS 3,481,411 A * 12/1969 Wood ................ 175/56 X
3,511,323 A * 5/1970 Riley, Jr. .............. 175/56 X
5,599,146 A   2/1997 Scheer
6,948,574 B2 * 9/2005 Cramer et al. ........... 175/403

FOREIGN PATENT DOCUMENTS

| DE | 4239373 A1 | 6/1993 |
| DE | 0114672 | 9/2002 |
| EP | 0277823 | 4/1991 |
| EP | 0646435 | 4/1995 |
| GB | 2016350 A | 9/1979 |
| SU | 0986752 | 1/1983 |

* cited by examiner

*Primary Examiner*—Greg Binda
(74) *Attorney, Agent, or Firm*—Abelman, Franye & Schwab

(57) ABSTRACT

A clamping device connects two, axially harmonically oscillating components which oscillate, as a result of their respective plane surfaces impacting each other with a frequency ω in the form of a stationary longitudinal wave with a distance A between two nodes K. The clamping device includes an axially extending springy gripping yoke having two clamping elements. The two clamping elements are located at opposite ends of the gripping yoke. The two clamping elements are spaced apart from each other by a distance corresponding to the distance A between the two nodes K of the longitudinal wave.

17 Claims, 4 Drawing Sheets

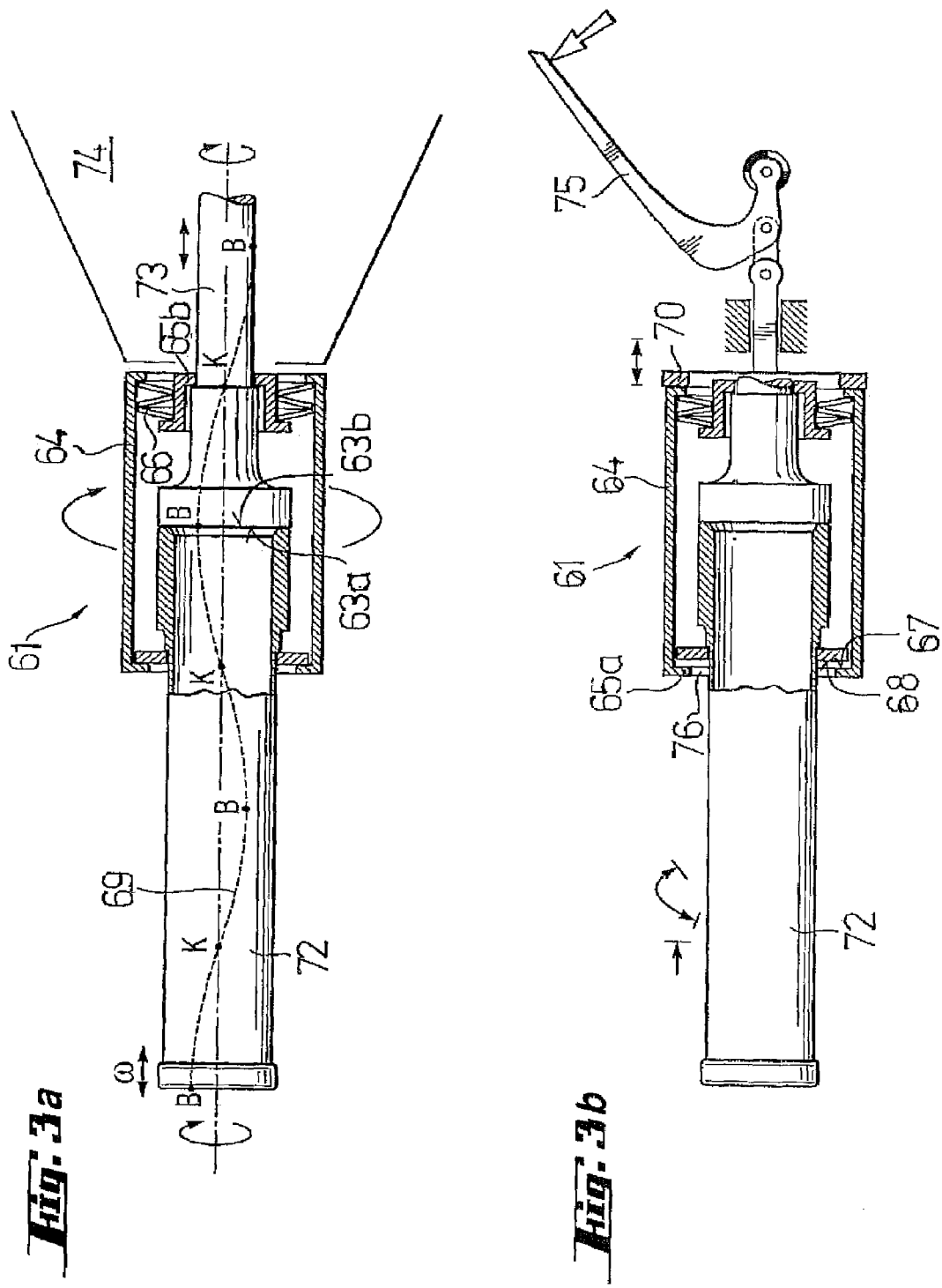

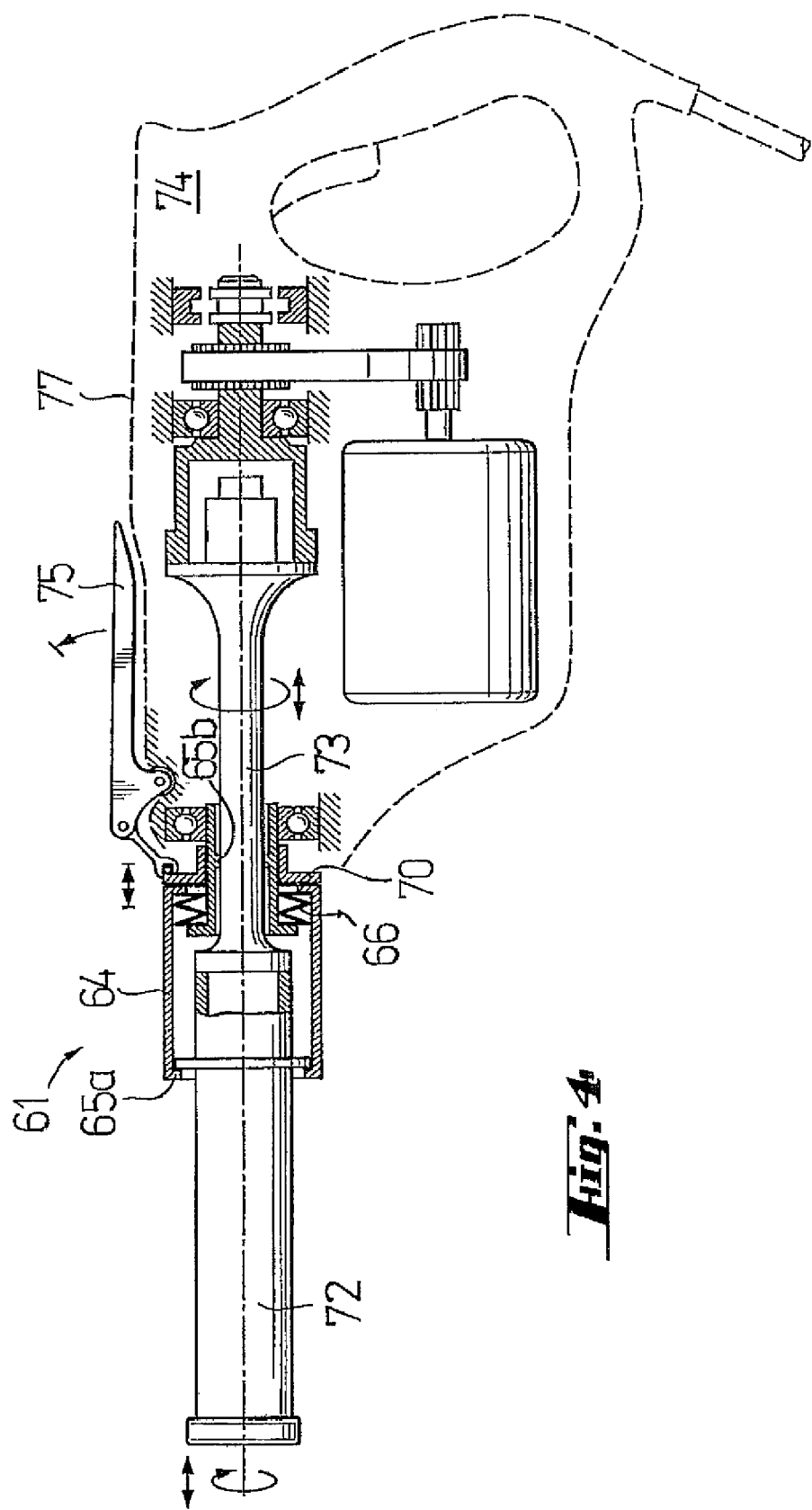

CLAMPING DEVICE FOR AXIALLY HARMONICALLY OSCILLATING COMPONENTS

BACKGROUND OF THE INVENTION

1. Field of the Invention

The present invention relates to a clamping device for axially harmonically oscillating components and, in particular, to a tool holder for an ultrasonic annular core bit.

2. Description of the Prior Art

The known solutions for connecting two components are divided roughly in thread connections, cone connections, and clamping connections.

British Publication GB 2016350 discloses use of thread and cone connections for tool holders for axially harmonically oscillating ultrasonic working tools. The connection elements are arranged at respective antinodes of a longitudinally extending stationary wave because at these locations node points of tension are formed and, therefore, only minimal axial tension and/or compression stresses are encountered. With ultrasonic, axially harmonically oscillating components, however, cold welds can be formed in the thread or cone surfaces, and the connection elements can be separated primarily with the use of auxiliary means such as special tools.

German Publication DE 4239373 discloses a connection of two tool parts with cooperating plane surfaces, wherein in a radially inner core region of the first tool part, there is formed a hollow space opened at an end surface with bayonet-shaped, inner conical undercut in which a locking peg of the second tool part with a clamping cone engages. Upon axial tensioning, the radially outer plane surfaces of both tool parts becomes frictionally connected. Upon being subjected to ultrasonic action, such locking pegs loosen automatically.

Accordingly, an object of the present invention is a clamping device for axially harmonically oscillating components and which can be closed and opened without use of any auxiliary means.

SUMMARY OF THE INVENTION

This and other objects of the present invention, which will become apparent hereinafter, are achieved with a clamping device for connecting two axially harmonically oscillating components which oscillate as a result of their respective plane surfaces impacting each other and that includes an axially extending springy gripping yoke provided at one of its ends with at least one clamping element, and spring means for axially elastically connecting the at least one clamping element with at least one further clamping element provided at another end of the springy gripping yoke, with the at least one clamping element and the at least one further clamping element being oriented toward a respective opposite end, and forming respective compressible contact surfaces located in nodes of a stationary longitudinal wave which is formed at the oscillating frequency.

With the clamping elements of the springy gripping yoke being located at the nodes of a longitudinal stationary wave formed by the components, the springy gripping yoke itself is free of oscillations, although plane surfaces which are located between the nodes and impact each other, have large axial oscillation amplitudes. With a conventional positioning of plane surfaces at the antinode, these amplitudes are maximal, whereby no axial stress oscillations, the tensile components of which can loosen the oscillation energy transmission connection of the components, take place. Minimal axial stress oscillations, which can practically still be found on the plane surfaces, are displaced completely by compression stresses, which are generated by the spring, into the compression region. Thereby, the tensile stress components are completely eliminated.

Advantageously, the springy gripping yoke is formed as a clamping sleeve which radially outwardly surrounds the components, whereby the clamping forces are circumferentially uniformly distributed.

Advantageously, the spring is formed by conventional constructive means such as expandable folds, expandable indentations, reductions of cross-section, slotting, etc. which form a yieldable portion of the springy gripping yoke. Thereby, the springy gripping yoke can be constructively and technologically simply formed as a one-piece part. The yieldable springy gripping yoke has a small cross-section and has the spring formed integrally therewith.

Alternatively, the spring can be formed as a magnetic coupling, advantageously as electromagnetic coupling. Thereby, the spring is not susceptible to mechanical fatigue that may be caused by axial stress oscillations. In addition, the electromagnetic coupling can be easily released by interrupting the current flow.

Alternatively, advantageously, the spring can be formed as a mechanical spring, advantageously, a tensile spring that can be technologically simply arranged between the clamping elements, imparting compressive stresses. Still alternatively, the spring can be formed as an inversely arranged compression spring provided between the overlapping parts. As a result, the spring length is not added to the clamping mean length.

Advantageously, the compression spring is formed as a helical spring, which permits to realize a wider linear-elastic expansion region than with other springs. As a result, the clamping device becomes insensible to tolerances in the axial distance of the contact matching surfaces.

Alternatively, the spring can be formed as a plate spring, whereby a wider expansion region at a relatively smaller length in comparison with other springs can be realized. This permits to reduce the total length of the clamping device.

Advantageously, the at least one clamping element is formed as a circumferentially closed clamping ring with separate circumferentially arranged projecting contact surfaces, whereby the contact forces are balanced over the circumference and are uniformly distributed. With a correspondingly formed spring with at least several separate circumferentially arranged projecting contact surfaces, an integral clamping element is provided.

Advantageously, the clamping ring has a bayonet-shaped opening on radially inwardly projecting region of which the contact surfaces are formed. Thereby, a component with corresponding associated bayonet-shaped matching contacts can be displaced in the clamping device and be securely positioned as a result of rotation.

Advantageously, the springy gripping yoke is connected with opening means for axially displacing the clamping element and which displaces the clamping elements against the biasing force of the spring means. Thereby, the clamping device can be open.

Advantageously, the opening means are so formed that it is accessible from outside. This permits to open the clamping device from outside manually, without auxiliary means.

Advantageously, the clamping element forms the opening means, advantageously, in form of a pivotable, securable eccentric lever the circumferential eccentric surface of which forms the contact surface, which permits to reduce the number of parts.

Advantageously, the clamping element fixedly connects the clamping device exactly at one end of the springy gripping yoke with drive means of a power tool. The clamping device is formed as a tool holder for at least partially harmonically oscillating working tool. Thereby, such working tools can be releasably secured.

Advantageously, the tool holder has opening means formed as a circumferentially closed, opening ring with which another axially displaceably end of the springy gripping yoke, is brought into contact.

Advantageously, the opening means is formed as an accessible from outside, opening element. Thereby, an ergonomically handled tool holder is realized.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 3a a schematic cross-sectional view of the inventive clamping device formed as a tool holder shown in a closed position;

FIG. 3b a schematic cross-sectional view of the tool holder shown in FIG. 3a and shown in an open position; and FIG. 4 a schematic cross-sectional view of a hand-held core drilling machine with a tool holder formed as a clamping device according to the present invention.

DETAILED DESCRIPTION OF THE PREFERRED EMBODIMENT

Figure 1:
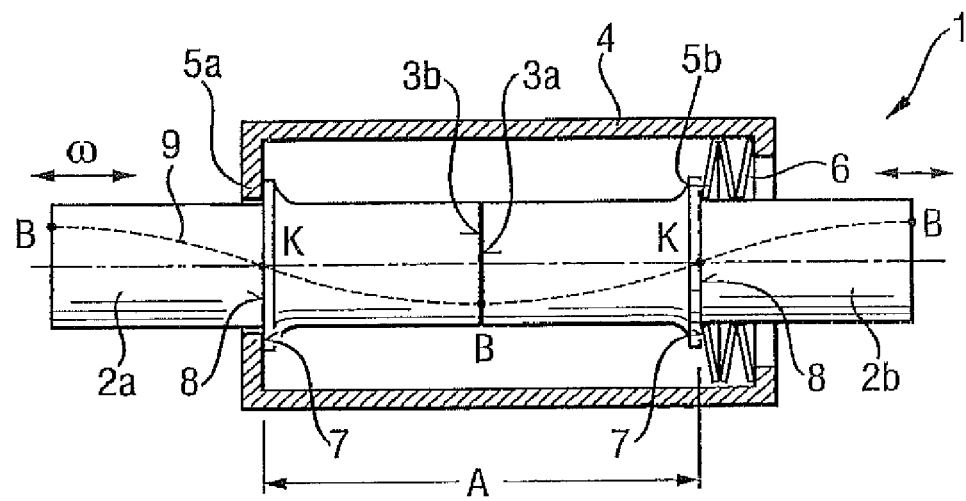
FIG. 1 a schematic cross-sectional view of a clamping device according to the present invention.

A locking or clamping device 1 according to the present invention, which is shown in FIG. 1, has, for connecting two components 2a, 2b which oscillate, as a result of their respective plane surfaces 3a, 3b impacting each other, with a frequency ω in the form of a longitudinal wave 9 with a distance A between two nodes K, springy gripping yoke 4 in the form of a clamping sleeve. The clamping sleeve has, at one of its ends, at least one clamping element 5a axially and elastically connected with a clamping element 5b provided at another end of the clamping sleeve by a spring 6. In the embodiment shown in the drawings, the spring 6 is formed as a plate spring and is formed integrally with the clamping element 5b. The clamping elements 5a, 5b form respective axially compressible contact surfaces 7 oriented toward respective opposite ends and which cooperate with two respective correspondingly formed contact surfaces 8 provided on the components 2a, 2b. The contact surfaces 8 are provided at nodes K of the stationary longitudinal shaft 9 formed the frequency ω. The plane surfaces 3a, 3b abut each other at an antinode B.

Figure 2A:
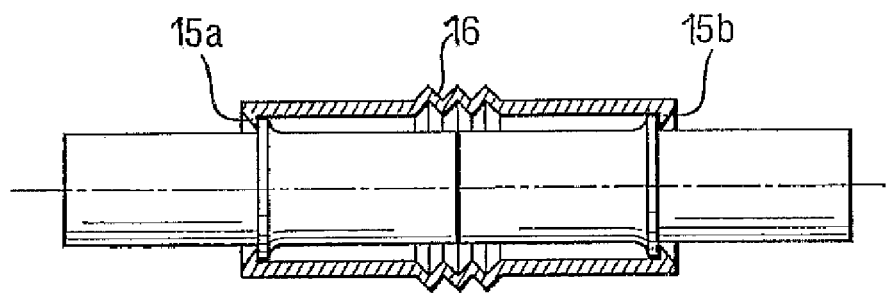
FIG. 2a-e schematic cross-sectional views of different embodiments of the inventive clamping device.

In the embodiment shown in FIG. 2a, the spring 16, which is provided between the clamping elements 15a, 15b, is formed of expandable folds of a one-piece clamping sleeve.

Figure 2B:
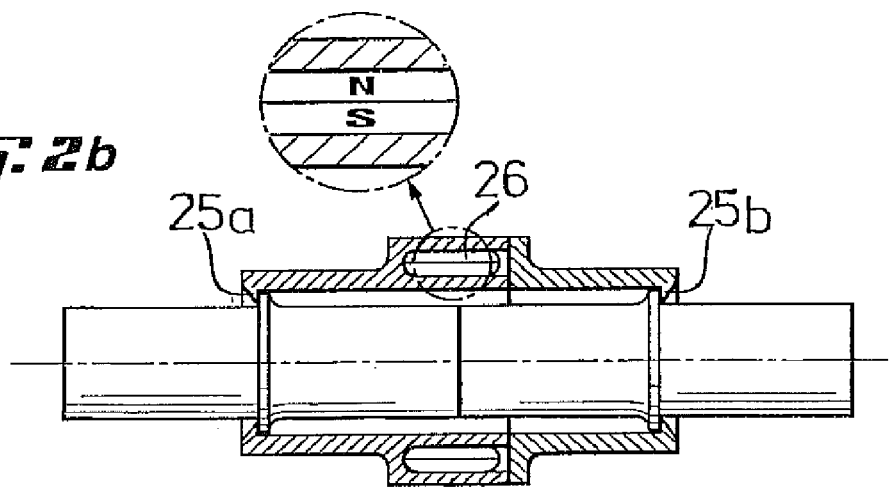

In the embodiment shown in FIG. 2b, the spring 26, which is provided between the clamping elements 25a, 25b, is formed as a magnetic coupling with an annular permanent magnet the axially open, at one-side, magnetic flux of which strives to axially connect the clamping sleeve which is formed of two parts.

Figure 2C:
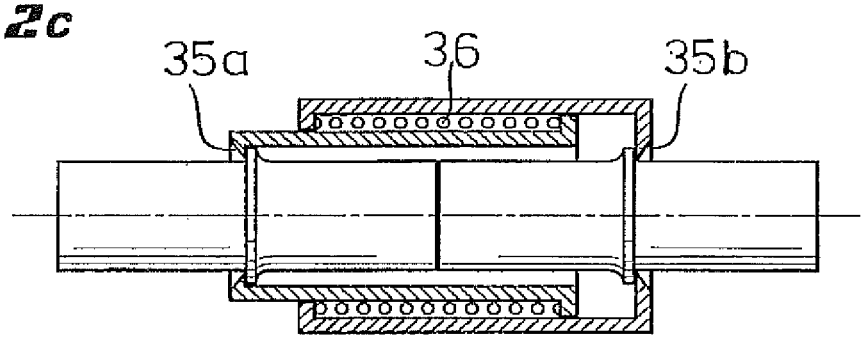

In the embodiment shown in FIG. 2c, the spring 36, which is provided between the two clamping elements 35a, 35b, is formed as a mechanical spring provided between two, axially overlapping each other, parts of the clamping sleeve. The mechanical spring is formed as an inverted spiral spring.

Figure 2D:
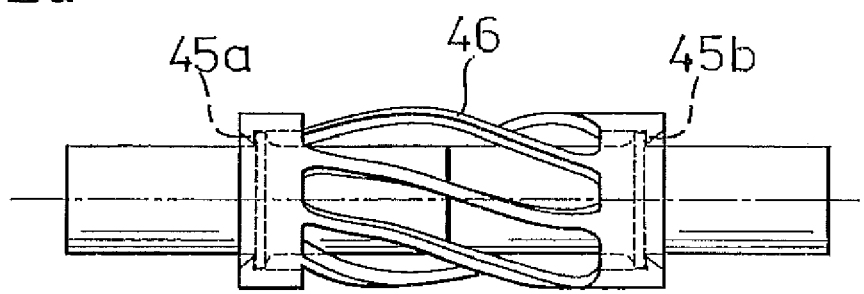

In the embodiment shown in FIG. 2d, the spring 46, which is provided between the two clamping elements 45a, 45b, is formed of a plurality of twisted and bulged springy webs of a one-piece clamping sleeve which are formed under shearing conditions.

Figure 2E:
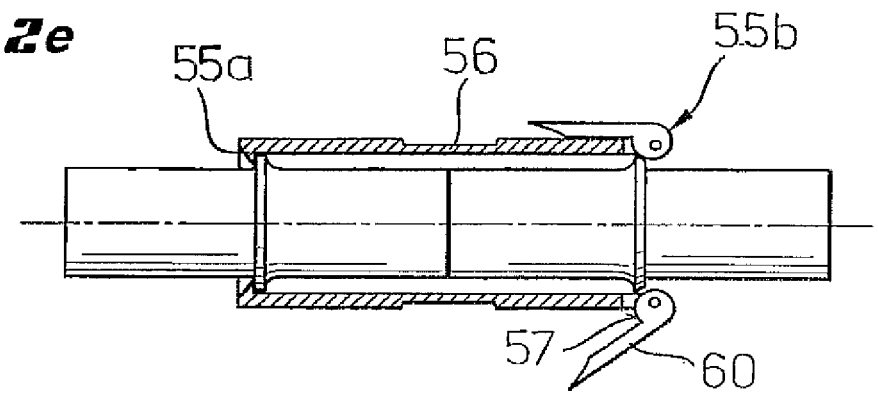

In the embodiment shown in FIG. 2e, the spring 56, which is provided between the two clamping elements 55a, 55b, is formed by an axially limited reduction of the cross-section of the clamping sleeve. In addition, the clamping element 55b forms opening means 60 in form of a manually operable, pivotable,and fixable eccentric lever the circumferential eccentric surface of which forms the contact surface 57.

In the embodiment shown in FIG. 3a, the clamping device 61 is formed as a tool holder for a rotatable and harmonically oscillating working tool 72 in form of a hollow annular core bit. The tool holder is fixedly connected at an end of a springy gripping yoke 74 with rotatable and oscillating drive means 73 of a power tool 74 in form of a hand-held core drilling tool with superimposed ultrasonic action. The tool holder is connected with the drive means 73 by a clamping element 65b located in a node K of a stationary, at a predetermined frequency ω, longitudinal wave 69. The plane surfaces 63a, 63b, which are used for transmission of the oscillation energy from the drive means 73 to the working tool 72, impact each other at the antinode B. In the position shown in FIG. 3a, the tool holder is in its closed position.

In the open position of the tool holder, which is shown in FIG. 3b, opening means 70 in form of a circumferentially closed ring is axially displaceable by a manually operable, accessible from outside, opening element 75 in form of a toggle lever. With the opening element 75, the other end of the springy gripping yoke 64, which is formed as a clamping sleeve, can be brought in contact and a portion of which is displaceable. The locking element 55a, which is provided at the other end of the clamping sleeve, is formed as a circumferentially closed clamping ring formed integrally with the springy gripping yoke 64. The clamping ring has contact surfaces 67 which are separately circumferentially arranged about a bayonet-shape opening 76 and are provided on its projecting radially inwardly regions (these are shown in the plane of the drawing). The working tool 72 in form of the annular core bit is provided with corresponding associated, extending radially outwardly, bayonet-shaped matching contact surfaces 68 which can be axially displaced, with the clamping ring, into the clamping device 61 and be locked by rotation or be released by rotation.

A power tool 74, which is formed as a hand-held core drilling tool and is shown in FIG. 4, has a clamping device 61 formed as a tool holder for a rotatable and axially harmonically oscillating tool 72 in form of an annular core drill. The power tool has a housing and a rotatably supported therein, clamping element 65b in form of a guide sleeve that is fixedly connected with the drive means 73. The clamping element 65b is connected by a spring 66 with a further clamping element 65a provided at another end of the springy gripping yoke 64. With the accessible from outside, opening element 75 in form of a toggle lever pivotably supported on the housing 77 and which acts on an axially displaceable opening element 70 in form of an annular ring, the locking element 65*a* is axially displaceable against the biasing force of the spring 66.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A clamping device for connecting two components having impacting each other plane surfaces (3*a*, 3*b*) and harmonically oscillating with a frequency ω in the form of a stationary longitudinal wave (9) with a distance (A) between two nodes (K), the clamping device comprising:
    an axially extending springy gripping yoke (4) having at least one clamping element (5*a*) located at one end of the yoke (4); and
    spring means (6) for axially elastically connecting the at least one clamping element (5*a*) with at least one further clamping element (5*b*) provided at another end of the springy gripping yoke (4), the at least one clamping element (5*a*) and the at least one further clamping element (5*b*) being spaced from each other by a distance corresponding to the distance (A) between the two nodes (K) of the longitudinal wave (9), being oriented toward respective opposite ends and with at least one of the clamping elements (5*a*, 5*b*) having a contact surface (7) for receiving compression forces.

2. A clamping device according to claim 1, wherein the springy gripping yoke (4) includes a clamping sleeve having an opening for receiving the components (2*a*, 2*b*).

3. A clamping device according to claim 1, wherein the spring means (6) is an integral part of the springy gripping yoke (4).

4. A clamping device according to claim 1, wherein the spring means (6) is formed as a magnetic coupling.

5. A clamping device according to claim 4, wherein the spring means is formed as an electromagnetic coupling.

6. A clamping device according to claim 1, wherein the spring means is a mechanical spring including one of a tension spring and a compression spring.

7. A clamping device according to claim 6, wherein the spring means is formed as a spiral spring.

8. A clamping device according to claim 6, wherein the spring means includes a plate spring.

9. A clamping device according to claim 1, wherein the at least one clamping element is formed as a circumferentially closed clamping ring with separate circumferentially arranged projecting contact surfaces (7).

10. A clamping device according to claim 9, wherein the clamping ring has a bayonet-shaped opening (16) on radially inwardly projecting region of which the contact surfaces are formed.

11. A locking device according to claim 1, wherein the springy gripping yoke (4) is connected with opening means (10) for axially displacing the clamping elements (5*a*, 5*b*) and which displaces the clamping element (5*a*, 5*b*) against the biasing force of the spring means (6).

12. A clamping device according to claim 11, wherein the opening means (10) are manually operable from outside.

13. A clamping device according to claim 11, wherein the at least one further clamping element (5*b*) forms opening means (10) integral therewith.

14. A clamping device according to claim 13, wherein the opening means (10) is formed as an eccentric pivotal lever the circumferential eccentric surface of which forms the contact surface.

15. A clamping device according to claim 1, wherein the further clamping element (5*b*) fixedly connects the clamping device exactly at one end of the springy gripping yoke (4) with drive means (13) of a power tool, and wherein the clamping device is formed as tool holder for at least partially harmonically oscillating working tool (12).

16. A clamping device according to claim 15, wherein the tool holder has opening means (10) formed as a circumferentially closed opening ring with which another axially displaceable end of the springy gripping yoke (4) is brought into contact and a portion of which is displaceable.

17. A clamping device according to claim 16, wherein the opening ring is displaceable with an opening element (15) accessible form outside.

\* \* \* \* \*